(12) United States Patent
Maskell et al.

(10) Patent No.: US 11,484,149 B2
(45) Date of Patent: Nov. 1, 2022

(54) SHRINK FILM CONTAINER FOR SELF-HEATING ASSEMBLY

(71) Applicant: Tempra Technology, Inc., Bradenton, FL (US)

(72) Inventors: Alan James Maskell, Grittleton (GB); Corey R. Blanchette, Sarasota, FL (US); Cullen M. Sabin, Bradenton, FL (US)

(73) Assignee: Tempra Technology, Inc., Bradenton, FL (US)

( * ) Notice: Subject to any disclaimer, the term of this patent is extended or adjusted under 35 U.S.C. 154(b) by 84 days.

(21) Appl. No.: 17/186,409

(22) Filed: Feb. 26, 2021

(65) Prior Publication Data

US 2021/0289987 A1 Sep. 23, 2021

Related U.S. Application Data

(60) Provisional application No. 62/992,290, filed on Mar. 20, 2020.

(51) Int. Cl.
*A47J 36/28* (2006.01)
*F24V 30/00* (2018.01)
*B65D 81/34* (2006.01)

(52) U.S. Cl.
CPC .......... *A47J 36/28* (2013.01); *B65D 81/3484* (2013.01); *F24V 30/00* (2018.05)

(58) Field of Classification Search
CPC ......... F24V 3/00; B35D 81/3484; A47J 36/28
USPC ........................................ 126/263.01–263.1
See application file for complete search history.

(56) References Cited

U.S. PATENT DOCUMENTS

| 10,478,015 B2 | 11/2019 | Sabin et al. |
| 2015/0017287 A1 | 1/2015 | Sevim |
| 2015/0316308 A1* | 11/2015 | Knudsen ............... F25D 5/00 62/4 |
| 2016/0338530 A1* | 11/2016 | Sabin .................. F24V 30/00 |
| 2017/0153043 A1 | 6/2017 | Young |
| 2017/0362006 A1 | 12/2017 | McDougal et al. |

FOREIGN PATENT DOCUMENTS

WO 2020214727 10/2020

OTHER PUBLICATIONS

International Search Report for PCT/US21/19793, dated Apr. 21, 2021.

* cited by examiner

*Primary Examiner* — Vivek K Shirsat
(74) *Attorney, Agent, or Firm* — Sheehan Phinney Bass & Green PA (57) ABSTRACT

A self-heating assembly includes a product tray for containing a product to be heated and a heater tray outside the product tray and configured relative to the product tray to define a reaction space between the heater tray and the product tray. A frangible container made of a shrink film material is inside the reaction space. The frangible container contains a first reactant that is a liquid. A second reactant is outside the frangible container. The first and second reactants are configured to react exothermically upon contact with each other.

21 Claims, 5 Drawing Sheets

NOTE: Projected Average Vapor Loss Per Day (as per graph)
Polypropylene: .007 g
PVC: .035 g

FIG. 6

SHRINK FILM CONTAINER FOR SELF-HEATING ASSEMBLY

CROSS REFERENCE TO RELATED APPLICATION

This application claims the benefit of priority to U.S. Provisional Patent Application No. 62/992,290, entitled SHRINK FILM CONTAINER FOR SELF-HEATING ASSEMBLY, which was filed on Mar. 20, 2020. The disclosure of the prior application is incorporated by reference herein in its entirety.

BACKGROUND

This disclosure relates to self-heating assemblies and, more particularly, relates to a shrink film container for a self-heating assembly.

SUMMARY OF THE INVENTION

In one aspect, a self-heating assembly includes a product tray for containing a product to be heated and a heater tray outside the product tray and configured relative to the product tray to define a reaction space between the heater tray and the product tray. A frangible container made of a shrink film material is inside the reaction space. The frangible container contains a first reactant that is a liquid. A second reactant is outside the frangible container. The first and second reactants are configured to react exothermically upon contact with each other.

In another aspect, a method of heating a product includes providing such a self-heating assembly (with a shrink film material that contains a liquid chemical reactant that participates in the exothermic reaction) and manipulating a means for rupturing the frangible container to activate the exothermic reaction.

In some implementations, one or more of the following advantages are present.

For example, a self-heating assembly may be provided that produces heat quickly and that actually utilizes, without waste, most if not all of the chemical reactants contained therein to produce heat. As a result, the self-heating assembly is able to produce a large amount of heat in a highly efficient manner. The confirmation(s) described herein that facilitate these advantages is (are) relatively simply is design, relatively easy to manufacture, and reliable.

Other features and advantages will be apparent from the description and drawings, and from the claims.

BRIEF DESCRIPTION OF THE DRAWINGS

Like reference characters refer to like elements.

DETAILED DESCRIPTION

This application relates to self-heating assemblies of the type in which two reactants—at least one of which is a liquid, and the other of which may be a solid—are brought into contact with one another to react in an exothermic manner to produce heat for heating a product (such as food or drink) contained therein.

Prior to activation, the liquid reactant inside the heating assembly is contained within a frangible container that is made of or includes a shrink film that shrinks when exposed to heat. In a typical implementation, to initiate heating, the container is torn, punctured, ruptured, or otherwise compromised—to create one or more openings in the container. These openings allow at least some of the liquid reactant to escape the container. Typically, however, at least some portion—often a significant portion—of the container remains intact after being compromised. Since the container remains somewhat intact, typically some portion of the liquid reactant remains trapped by the container and prevented from reaching the solid reactant. Meanwhile, the liquid reactant that manages to escape the container through the opening(s) comes into contact with the solid reactant and begins reacting with the solid reactant in an exothermic manner. This exothermic reaction produces heat that causes the shrink film of the container to begin to shrink. The shrinking of the shrink film tends to squeeze more of the liquid reactant out of the container. This makes more of the liquid reactant available to react with the solid reactant and the additional reaction produces more heat for heating the product. As more heat is generated, the heat shrink film shrinks more, tending to squeeze more of the liquid reactant out of the frangible container to react more with the solid reactant.

In a typical implementation, the amount of liquid reactant that ends up exiting the frangible container and therefore becoming available to react with the solid reactant tends to be greater than the amount of liquid reactant that would be so available if the frangible container were not made from or include a shrink film material. Moreover, in a typical implementation, the rate at which the liquid escapes the frangible container may be increased by virtue of the frangible container being made of or include shrink film material. Thus, in a typical implementation, a larger amount of heat can be produced in a shorter amount of time by a self-heating assembly, in which the liquid reactant is held within a frangible container that is made of or includes shrink film, as described herein.

Figure 1:
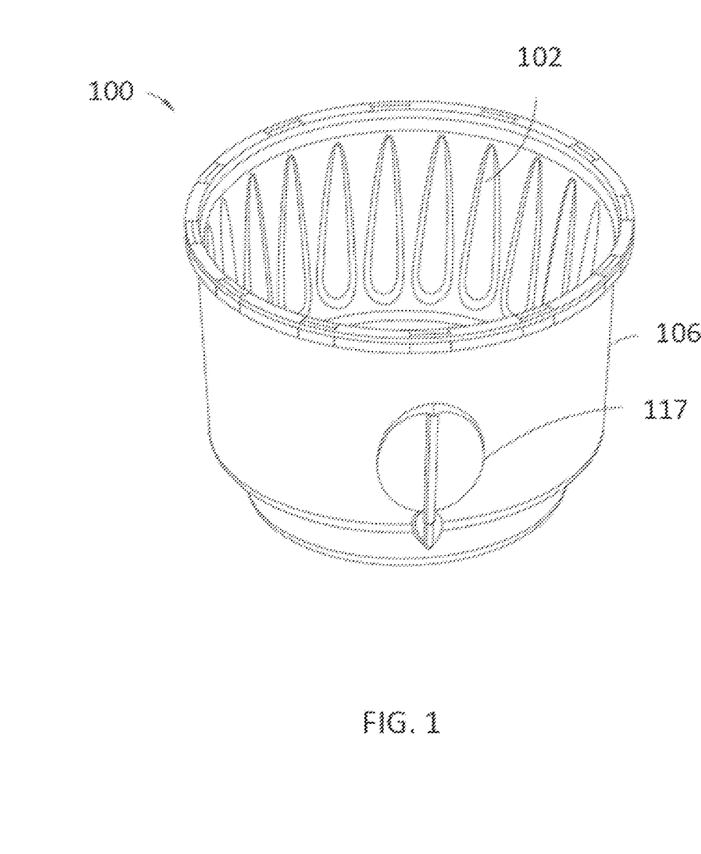
FIGS. 1 to 3 show one exemplary implementation of a self-heating assembly, in which two reactants—one a liquid (and contained in a shrink film material) and the other a solid—are brought into contact with one another to react in an exothermic manner.
Figure 2:
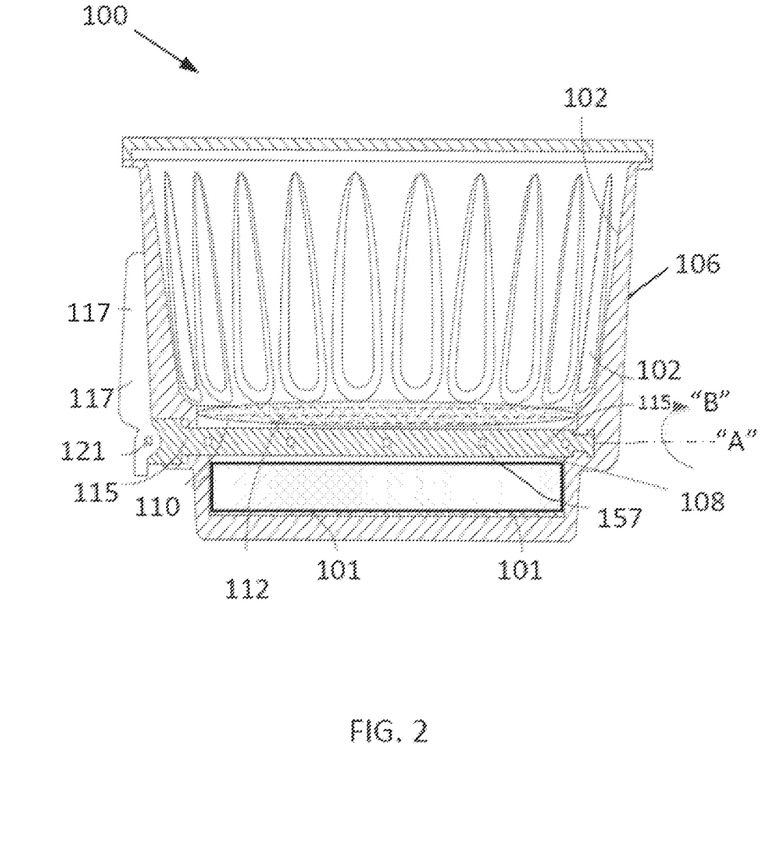
Figure 3:
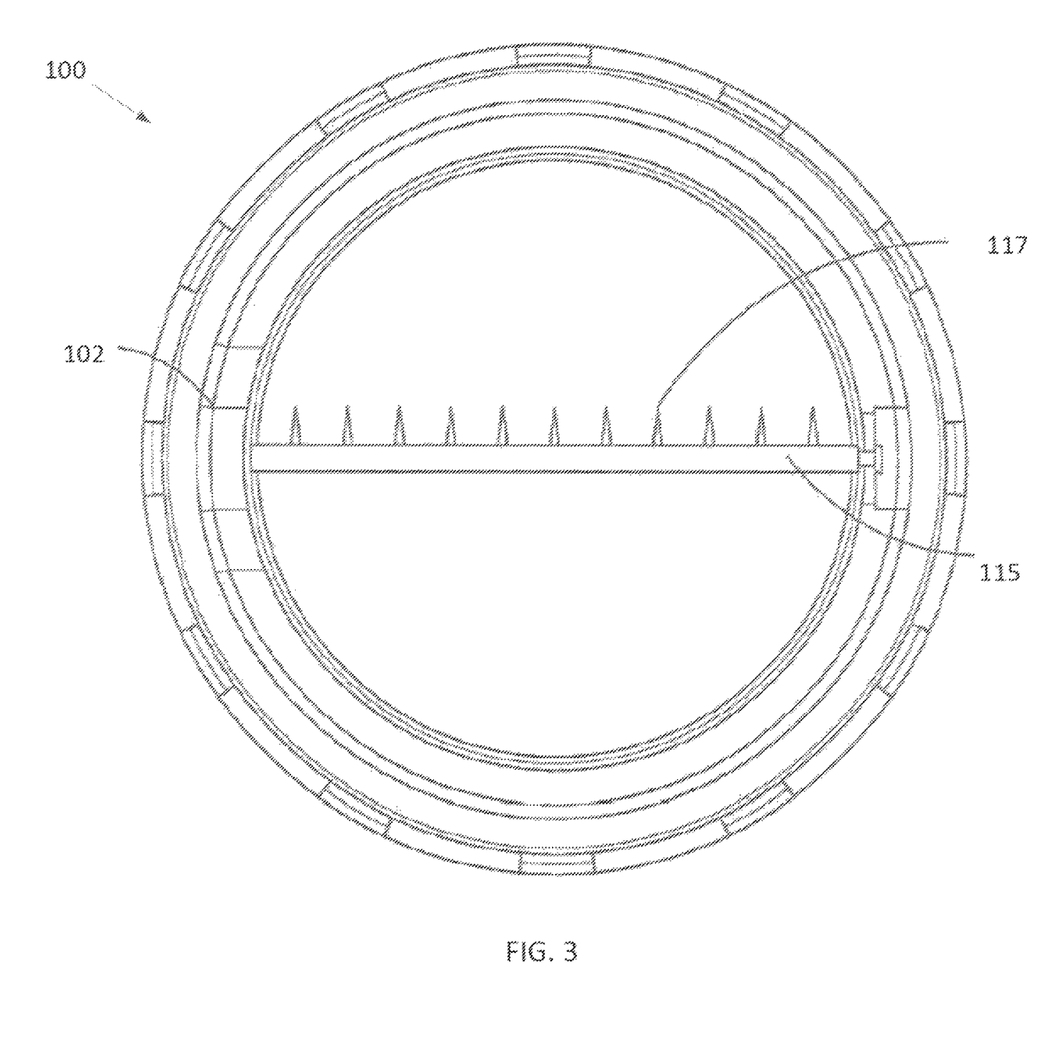

FIGS. 1 to 3 show one exemplary implementation of a self-heating assembly 100 of this type, in which two reactants—one a liquid and the other a solid—are brought into contact with one another to react in an exothermic manner.

The illustrated self-heating assembly 100 is similar in some ways to the self-heating assembly described in prior patent number Ser. No. 10,478,015, issued Nov. 19, 2019, entitled, Self-Heating Assembly with Distributed Reactant, filed by the current patent applicant, Tempra Technology, Inc., incorporated by reference herein in its entirety. In the self-heating assembly 100 of FIGS. 1 to 3, however, the liquid reactant is contained in a frangible container 110 that is made of, or at least includes, a shrink film material. Other differences may be referenced herein as well.

The illustrated self-heating assembly 100 has two nested trays: a product tray 102 for holding a product (e.g., food, drink, etc.) to be heated and a heater tray 106 coupled to the product tray 102. The product tray 102 is nested inside the heater tray 106 and there is a reaction space 108 between them. In the illustrated implementation, the reaction space 108 extends from the base of the heater tray 106 to the base of the product tray 102 and from the sides of the heater tray 106 to the sides of the product tray 102. In a typical implementation, the product tray is filled with a product to be heated (e.g., food, drink, etc.) and then sealed (e.g., with a suitable cover, foil, etc. secured to and/or adhered to the upper perimeter surface of the self-heating assembly 100).

The frangible container 110 is inside the reaction space 108 and surrounds and contains the liquid reactant. In the illustrated implementation, the frangible container 110 is beneath the product tray 102. In a typical implementation, the frangible container 110 should be somewhat elastic. Moreover, the frangible container 110 should be durable enough to withstand the sometimes-rough treatment that the self-heating assembly 100 might experience, for example, during shipping and handling.

In the illustrated implementation, a sealed package 101 that contains the solid reactant also is beneath the product tray 102 inside the reaction space 108. Although sealed, in a typical implementation, the upper surface of the package 101 is liquid permeable, such that, when the liquid reactant is released from the frangible container and flows down to the upper surface of sealed container, the liquid reactant passes through the upper surface to reach and react with the solid reactant contained therein.

A cutting element 115 extends diametrically across a portion of the reaction space 108 between the frangible container 110, which is above the cutting element 115, and the sealed package 101, which is below the cutting element 115. In the illustrated implementation, the cutting element 115 has an elongate shaft, with a plurality of cutting blades 157 that extend in a radially outward direction from the shaft generally parallel to one another and perpendicular to the axis "A" of the shaft. The cutting element 115 is supported at opposite ends thereof by support surfaces or bearings that allow the cutting element to rotate about the axis "A" of the shaft in a direction indicated by arrow "B."

Before the exothermic reaction is initiated, the cutting element 115 is configured such that its blades 157 are not pointing toward or poking into the frangible container 110 and, therefore, do not pose a risk of cutting into or rupturing the frangible container 110 until moved. An example of this configuration is shown in FIGS. 2 and 3, where the cutting blades 157 extend in a horizontally outward direction from the elongate shaft, between the frangible container 110 above and the sealed package 101 below.

A knob 117 is at one end of the cutting element 115 and is exposed at an outer surface of the self-heating assembly 100. When a user turns the knob 117, the cutting blades 157 rotate about axis "A," which causes the cutting blades 157 to rotate into and cut, puncture, rupture, or otherwise compromise the frangible container 110 to create one or more openings in the container 110, through which at least some of the liquid reactant from the frangible container 110 can escape. The extent of the openings so created may depend, for example, on the relative geometry of the cutting blades 157 and frangible container 110, as well as on how far the user turns the knob 117. On the one hand, if the user only turns the knob a bit, then the opening(s) may be small, relatively speaking. On the other hand, if the user turns the knob a lot, then the opening(s) may be large, again, relatively speaking. Either way, in most instances, the opening(s) likely will not be large enough to ensure that all of the liquid reactant is immediately released from the frangible container 110 through the openings. Instead, in a typical implementation, some portion (perhaps quite a lot) of the liquid reactant will not be immediately released from the frangible container 110 through the opening(s) but will remain—essentially trapped—within the frangible container 110, unavailable to contact (and react with) the solid reactant.

As mentioned above, the sealed package 101 that contains the solid reactant is beneath the frangible container 110 in the reaction space 108. Moreover, the sealed package 101 has an upper layer that is permeable to the liquid reactant. Since the frangible container 110 is above the sealed package 101 and since the sealed package 101 has an upper layer that is permeable to the liquid reactant, any liquid reactant that is released from the frangible container 110 generally flows in a downward direction under the influence of gravity and into the sealed package 101, passing through its liquid permeable upper layer. The liquid reactant contacts the solid reactant within the sealed package 101 thereby initiating the exothermic reaction.

Heat from the exothermic reaction flows up through the reaction space 108 to and through the base and sides of the product tray 102 to heat the product contained therein. The heat also reaches the frangible container 110, of course, which is made of or includes a shrink film, and, therefore, causes the frangible container 110 to begin shrinking. When heat from the burgeoning reaction causes the torn frangible container 110 to begin shrinking, the shrinking tends to squeeze more of the remaining liquid reactant out of the frangible container 110 through the opening(s) in the frangible container 110.

The shrinking continues and the more the frangible container shrinks, the more the remaining liquid reactant is squeezed out. The more the liquid reactant escapes, the more heat is generated in the self-heating assembly 100. The more heat generated in the self-heating assembly 100, the more the frangible container shrinks. In a typical implementation, therefore, the fact that the frangible container is made of or includes a shrink film material helps ensure that a greater percentage of liquid reactant in the heating assembly will be made available more quickly to react with the solid reactant in the self-heating assembly 100. Accordingly, in a typical implementation, the self-heating assembly 100 is able to produce a large amount of heat very efficiently and very quickly.

The reaction space 108 accommodates the continuing exothermic reaction, the heat from which continues to pass through the product trays 102 to heat the product contained therein. In a typical implementation, after initiating the heating process (e.g., by turning the knob to rupture the frangible shrink film container 110), the user will allow some time to pass (e.g., a minute or so) and then peel back the cover of the self-heating container 100 to access and consume (or otherwise use) the heated product inside the product tray 102. In some implementations, a few minutes of heating time may be required to heat the product sufficiently; however, the time may vary depending on the design of the self-heating assembly and the heat capacity and viscosity of the food or product inside the self-heating assembly to be heated.

The frangible container 110 can be made of any one of a variety of different materials or combinations thereof. In a typical implementation, at least one such material is a shrink film material. A few examples of suitable shrink film materials include polyethylene (PE), polyvinyl chloride (PVC), polyolefin (POF), polyethylene terephthalate (PET), polylactic acid (PLA), and combinations thereof. In such implementations, the shrink film material typically forms a closed pouch that surrounds and contains the liquid reactant.

Certain shrink film materials have higher moisture vapor transmission rates (MVTR) than others. MVTR is a measure of the passage of water vapor through a substance; it can represent a measure of the permeability of a moisture barrier. It is generally undesirable for the liquid reactant to escape from the frangible container 110 (e.g., by transmission through the frangible container) unless and until a user deliberately activates the self-heating assembly 100 (e.g., by turning the knob to rupture the frangible container 110). Therefore, in some implementations, especially those where the shrink film material might have an MVTR on the high side, the frangible container 110 includes a moisture barrier material in addition to the shrink film material. In some implementations, it may be desirable to select the moisture barrier material such that the MVTR of the overall frangible container allows for a moisture loss of less than 20% per year. A few examples of liquid barrier materials that might be suitable in various implementations include ethylene vinyl alcohol (EVOH), polyvinylidene chloride (PVDC), Saran™ (a polyethylene wrap) or polypropylene. In such implementations, the moisture barrier material helps prevent moisture from escaping the frangible container 110 until and unless the frangible container is deliberately ruptured (e.g., by a user turning the knob 117).

In implementations that include the moisture barrier material, the moisture barrier material may form a closed pouch that surrounds and contains the liquid reactant. The moisture barrier pouch may be inside the shrink material pouch. Moreover, the space between the shrink material pouch and the moisture barrier pouch is typically evacuated so that the shrink material pouch is in direct physical contact with the entire external surface of the moisture barrier pouch. Typically, there is no empty space between the two pouches. Thus, when the knob is rotated to rupture the frangible container 110, the cutting blades 157 to rotate into and cut, puncture, rupture, or otherwise compromise both the shrink material pouch and the moisture barrier pouch, substantially simultaneously.

There are a variety of ways to manufacture a frangible container 110 that includes a shrink film layer and a moisture barrier layer.

In one example, where the shrink film layer is inside the vapor barrier layer, the liquid reactant is poured into an open shrink film pouch. The shrink film is then sealed with a vacuum sealer. Then, the sealed shrink film pouch containing the liquid reactant is placed into an open moisture barrier pouch. The moisture barrier pouch is then sealed with a vacuum sealer to enclose and contain the sealed shrink film pouch, leaving virtually no air between the two pouches.

In another example, where the shrink film layer is outside the vapor barrier layer, the liquid reactant is poured into an open vapor barrier pouch. The vapor barrier pouch is then sealed with a vacuum sealer. Then, the vapor barrier pouch containing the liquid reactant is placed into an open shrink film layer pouch. The shrink film layer pouch is then sealed with a vacuum sealer to enclose and contain the sealed vapor barrier pouch, leaving virtually no air between the two pouches.

Alternatively, the shrink film material and moisture barrier material may be provided together in a single sheet (e.g., coextruded or laminated) and used to form the frangible layer with the shrink film material either inside or outside the vapor barrier layer. In some such implementations, the sheet may be used to form an open pouch, the liquid reactant is then poured into the pouch, and the pouch is sealed with a vacuum sealer.

Other methods of forming, filling and/or sealing the frangible container 110 are possible.

In a typical implementation, it is desirable to maximize shrinking of the frangible container 110 when the heater is operating, but to avoid shrinking under any temperatures that the self-heating 100 might be exposed to during anticipated shipping, handling, storage, etc. Certain shrink film materials, such as polyvinyl chloride (PVC), shrink quite a lot, and shrink both longitudinally and transversely. These types of shrink film materials can help ensure that a large amount of the liquid reactant in the frangible container 110 ends up being discharged from the frangible container 110 during heating. Moreover, certain shrink materials, such as PVC, begin to show noticeable shrinkage at very low temperatures (e.g., about 150 degrees Fahrenheit), which may be desirable as well.

Figure 5:
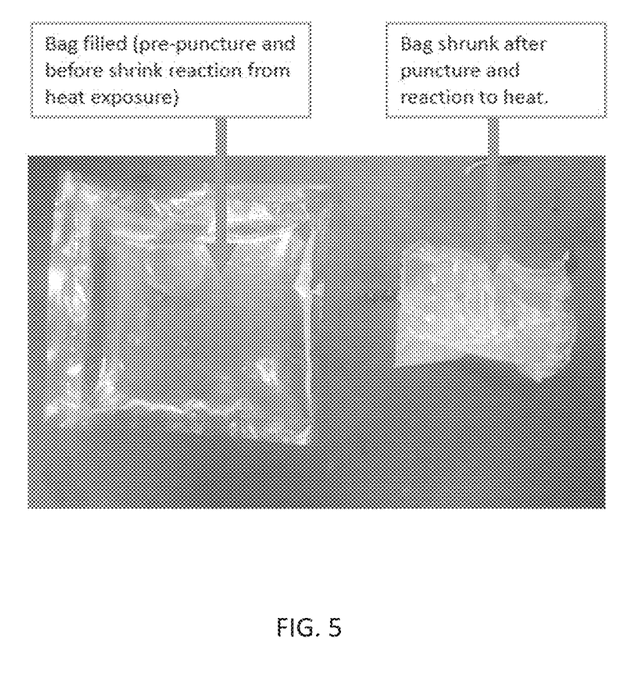
FIG. 5 is a photograph showing an example of a filled frangible container (bag), which is not shrunk, next to a frangible container (bag) that has been punctured, substantially emptied and shrunk.

FIG. 5 is a photograph showing an example of a filled frangible container (bag), which is not shrunk, next to a frangible container (bag) that has been punctured, substantially emptied and shrunk. The bag was initially about 3 inches by 3 inches and contained 44 cc of liquid. The bag after heating measured about 1.12 inches by 2 inches, representing a decrease in area to about 0.23 of its original size. The shrinkage in the longitudinal direction is clearly greater than that in transverse direction. The liquid retained in the bag after shrinkage and obvious wrinkling, was about 2 cc, or 5% of the original. The puncture that initiated the reaction is not visible because of the shrinkage and wrinkling, but it was a simple puncture with no tearing.

The self-heating containers 110/food heating packages in which the frangible containers (bags) are used generally must have a shelf life of many months in order for the product to be acceptable for commercial use. Under some storage conditions, the components of the heating system may be subjected to temperatures well above normal room temperature. As discussed herein, vapor can be transmitted through plastic films, and the transmission rate generally increases at elevated temperatures.

The liquid reactant for the system in which these bags are intended to be used is about 70% water (e.g., between about 60% and 80% water), and it is the water content of the liquid reactant that is one of principal regulators of the heating reaction. In general, less water content results in faster reactions. In non-liquid food heating, the rate of heat production of the heater should fairly closely match the rate at which the food can absorb the heat in the absence of stirring. Tests have shown that a water loss much above 10% wastes an unacceptable portion of the available food heating energy through the venting of steam. For the fuel bags in this particular system, the net acceptable loss of water is about 4 grams.

Figure 6:
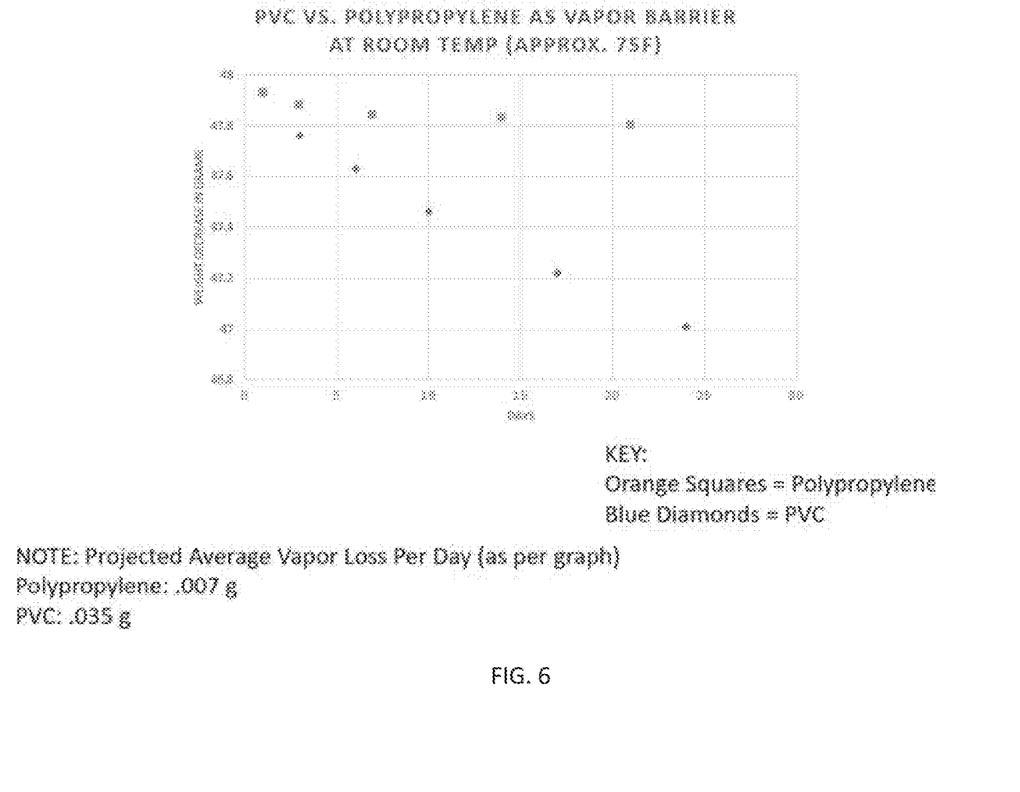
FIG. 6 shows a graph of the water loss from fuel bags (i.e., frangible containers) made from PVC only and same size fuel bags (i.e., frangible containers) made from polypropylene only.

FIG. 6 shows a graph of the water loss from fuel bags (i.e., frangible containers) made from PVC only and same size fuel bags (i.e., frangible containers) made from polypropylene only. Based on the data shown in the graph, the room temperature lifetime of the fuel (i.e., liquid reactant) in the two bags (i.e., frangible containers) would be about 114 days for the PVC, and about 571 days for the polypropylene. The situation is exacerbated if the temperature is elevated. At 120 degrees Fahrenheit, the daily water loss from the PVC bag is about 0.31 grams per day, giving a useful life of just thirteen days. The polypropylene bag performance is also degraded at elevated temperature of course. Its water loss is 0.069 grams per day for a useful lifetime of 58 days. It is probably not necessary to point out that there is no inhabited place on earth which has a temperature of 120 degrees 24 hours a day. The reason for choosing this elevated temperature is that the vapor diffusion rates are highly non-linear with temperature.

The data shown in FIG. 6 supports the proposition that one solution to the problem of limited shelf life for a PVC only shrinking bag (frangible material) is to line it with polypropylene. The puncturing teeth used to initiate the heating process easily puncture both bags, provided that the inner bag, which contains the liquid reactant, is not too thick. This solution has been proven to be satisfactory. The as-constructed bag without shrinkage shown in FIG. 5 is actually a double bag. The inner bag is invisible.

In a typical implementation of the self-heating container 100, and as shown in FIGS. 1 to 3, the sealed package 101 is sized so that it fills the bottom of the reaction space 108 completely, leaving virtually no empty space around its perimeter. This helps to ensure that all of the liquid reactant that flows out of the ruptured, and subsequently shrunk frangible container 110 ends up flowing into the sealed package 101 to react with the solid reactant contained therein.

Figure 4:
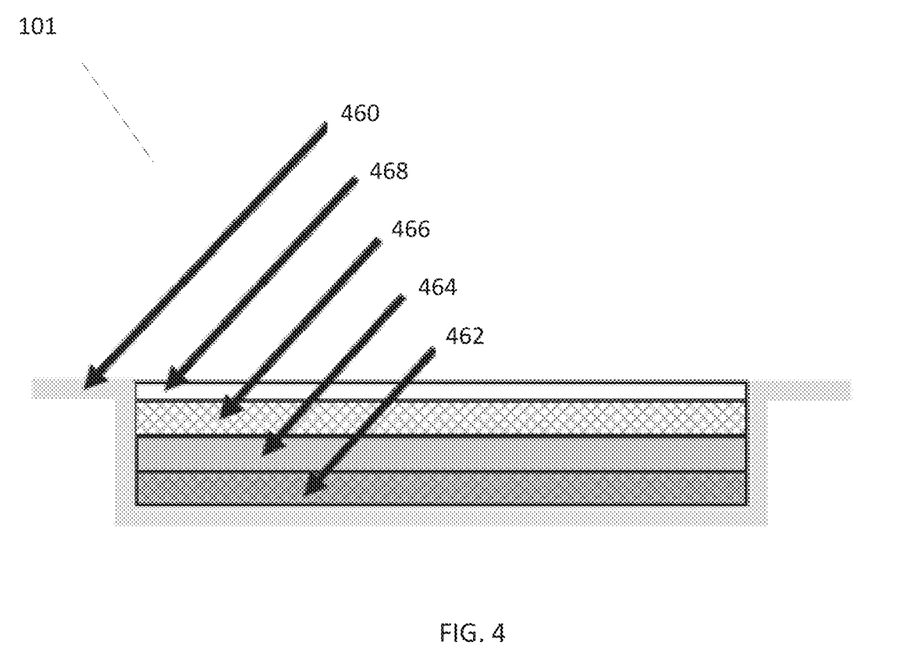
FIG. 4 is a schematic cross-sectional representation of an exemplary sealed package (containing the solid reactant in the self-heating assembly of FIGS. 1 to 3.

FIG. 4 shows a cross-sectional representation of an exemplary implementation of the sealed package 101 (containing solid reactant) from FIGS. 1 to 3.

The illustrated sealed package 101 has a tray-shaped outer container 460, a lower support structure 462 (e.g., a disk of open cell foam or the like) within the outer container 460, a layer of non-granular, solid reactant 464 (e.g., a disk of solid reactant) above the lower support structure 462 and within the outer container 460, an upper structure 466 (e.g., another disk of open cell foam or the like) above the solid reactant 464 and within the outer container 460, and an upper layer 468 (e.g., paper or the like) that is permeable to liquid (e.g., permeable to the liquid reactant) and that extends across an otherwise open top of the outer container 460 above the upper structure 466.

In the illustrated implementation, the outer container 460 forms a tray with a flat bottom, raised edges, and an outwardly-extended flange. The upper layer 468 extends across the opening at the top of the tray to seal the contents of the tray therein. More specifically, in the illustrated implementation, the outwardly-extended flange, in the illustrated implementation, provides a surface to which the upper layer 468 of the sealed package 101 is adhered or secured.

Any one of a variety of adhesive materials can be used to adhere the upper layer 468 of the sealed package 101 to the outwardly-extended flange of the outer container 460. In a typical implementation, the adhesive material is configured to remain tacky long enough for the cover sheet to be properly placed and pressed down. In various implementations, the adhesive materials are superglue, hot melt glue, two-part epoxy, Amazing Goop® adhesive, a household cement, which cures to a somewhat elastic bond, or any other one of a variety of suitable adhesives. Moreover, in a typical implementation, the adhesive materials are impervious to boiling water.

Moreover, the adhesive material typically is one that can stay intact and holding the upper layer 468 in contact with the outwardly-extended flange, throughout the life cycle of the sealed package 101 and the self-heating container 100. So, in a typical implementation, the adhesive material should be one that can withstand (and keep adhering) when exposed to the liquid reactant and the temperatures associated with the exothermic reaction (e.g., water boiling, approximately 100 degrees C.).

Any one of a variety of other techniques may be used to secure the upper layer 469 of the sealed package 101 in place across the otherwise open top of the outer container 460. For example, in some implementations, the outer perimeter of the upper layer 469 may be crimped onto the outwardly-extended flange of the outer container 460.

The outer container 460 of the sealed package 101 can be made from any one of a variety of solid materials. Typically, the outer container 460 is impermeable to liquid and able to withstand the temperatures associated with the exothermic reaction in the self-heating assembly 100. Moreover, typically, the outer container 460 is made from a solid material that can be shaped into a desired configuration (such as the tray-like shape shown in FIG. 4) and resist deformation at least somewhat. An example of such material is aluminum. Another example of such a material is copper, which is more expensive than aluminum, but could be half as thick as the aluminum.

The material of the outer container 460 (e.g., of aluminum) has a thickness. This thickness can vary. However, it can be desirable, in some instances, for the aluminum outer container to have a wall thickness of at least 0.005 inches. This minimum thickness can help ensure that even under fairly extreme off-design conditions local heating will not damage the heater tray 106, which is typically plastic. The heat conductivity associated with aluminum having at least the minimum thickness helps prevent such damage from occurring. In some implementations, the aluminum tray may have a wall thickness between 3 and 4 millimeters.

The height of the outer container 460 (i.e., the distance between the base and the flange) can of course vary. In various implementations, the height of the outer container 460 may be between about ¼ inch and 1 inch.

The lower support structure 462 is at the bottom of the outer container 460. In a typical implementation, the lower support structure 462 is a disk-shaped and made of open cell foam, or another cellular or porous material, through which liquid (e.g., the liquid reactant) can flow or pass. The lower support structure 462 in the illustrated implementation is dimensioned to cover the entire inner bottom surface of the outer container 460. Moreover, in the illustrated implementation, the side edge of the lower support structure 462 is in contact with the inner side wall of the outer container 460 arounds its entire perimeter.

In certain implementations, some of the solid reactant—in granular form—may be spread out across lower support structure 462 and supported, for example, atop and/or within the open cells or pores of the lower support structure 462. In those implementations, the solid granular reactant may be spread out substantially evenly across the lower support structure 462.

The lower support structure 462 is generally configured to facilitate liquid flow (e.g., flow of the liquid reactant) through the lower support structure 462. This enables any of the liquid reactant that reaches, for example, the outer perimeter of the lower support structure 462 to flow through the lower support structure 462 and reach any of the granular solid reactant that might be spread out within and/or on the lower support structure 462, as well as the bottom surface of the layer of solid reactant 464 that is directly above the lower support structure 462. In a typical implementation, this helps ensure that the exothermic reaction happens quickly and increases the likelihood that more granular reactant will actually react.

In a typical implementation, the lower support structure 462 has sufficient structural integrity to physically support any components that sit atop the lower support structure 462 without undue compression, which might compromise the ability of the lower support structure to carry the liquid reactant to the granular solid reactant within or on the lower support structure 462 and the bottom surface of the layer of solid reactant 464 directly above the lower support structure. In the illustrated implementation, for example, the lower support structure 462 is strong enough to physically support any granular solid reactant on or within the lower support structure 462, the layer of non-granular solid reactant 464 above the lower support structure 462, and the upper structure 466 above the layer of non-granular solid reactant 464. Typically, the lower support structure 462 does this with no more than very minimal, if any, noticeable compression—e.g., less than about 10% of its thickness.

The lower support structure 462 in the illustrated implementation has a height (e.g., from its lower surface, which is in contact with the base of the outer container 460 to its upper surface, which is opposite and above its lower surface) that is about ⅓ the height of the outer container 460. This can vary considerably, of course, and the lower support structure 462 can have a height anywhere from about $\frac{1}{16}^{th}$ of an inch (or less) to ½ an inch (or more). In one exemplary implementation, a disk of approximately $\frac{1}{8}^{th}$ inch thick open-cell plastic foam may be placed in the bottom of the aluminum tray before pouring the granular material into the tray. This, of course, provides a fuel flow path for the underside of the clump-cast granules during operation of the self-heating container 100.

The size of the individual grains of granular solid reactant that may be spread across, and throughout, the lower support structure 462 can vary as well. Some of the granules may be sized so that they sit atop the open cell foam material of the lower support structure 462. Some of the granules may be sized to fit within the open cells or pores of the lower support structure 462. In some implementations, the size of the individual grains may vary, such that some of the grains sit atop of the lower support structure 462 and some of the granules are within the open cells or pores of the lower support structure 462.

In some implementations, the grains are very small compared to the cells or pores of the lower support structure 462, which may have a nominal pore count, for example, between about 25 and 45 pores per inch (e.g., 30 PPI), such that the grains fall into and at least some of them reach the bottom (or near the bottom) of the lower support structure 462 through the cells or pores. Having grains at or near the bottom of the lower support structure 462 can be desirable, because these grains will begin reacting as soon as the liquid reactant reaches them (e.g., by flowing down to the bottom of the chamber). The resulting reaction produces boiling, which helps wet the grains of reactant located higher up in the lower support structure 462 and also the bottom surface of the layer of non-granular solid reactant 464.

The layer of non-granular solid reactant 464, in the illustrated implementation, is above and in direct physical contact with the lower support structure 462. This layer of solid reactant 464 is in the form of a solid disk with a flat top surface, a flat bottom surface, and a cylindrical side surface. The layer of non-granular solid reactant 464 typically has a cake-like consistency and, therefore, tends to maintain the disk-shaped configuration under normal handling conditions. Additionally, in a typical implementation, the solid bonded granules are rigid and strong enough to handle, but easily broken, and readily friable. Moreover, in a typical implementation, the layer of non-granular solid reactant 464 typically maintains its disk-shaped configuration unless and until it is exposed to the liquid reactant, with which it reacts, exothermically. The reaction begins to compromise the disk-shaped configuration of the layer of non-granular solid reactant 464. As the reaction continues, the layer of non-granular solid reactant 464 progressively dissolves until very little or none of the solid reactant remains.

In some implementations, the solid reactant, whether in granular or non-granular form, is an oxidizing agent (e.g., potassium permanganate, which may be coated with sodium silicate) and the liquid reactant is a reduction agent (e.g., an aqueous ethylene glycol fuel). It is possible of course for other types of reactants to be used instead. In this regard, many oxidizing agents are capable of generating suitable energies upon reaction with a corresponding fuel. Typical oxidizing agents include those comprising the alkali metal salts of the oxides of manganese and chromium. These include such compounds as potassium permanganate, and potassium chromate. Other suitable oxidizing agents are pyridinium dichromate, ruthenium tetroxide and chromic acid, as well as a host of other oxidizing agents. Preferably, the oxidizing agent comprises alkali metal salts of permanganate. The corresponding fuels which may be suitable for use in the exothermic chemical reaction are generally organic compounds. Particularly well-suited organic compounds are alcohols. Alcohols are easily oxidized to carbonyl-containing compounds by the oxidizing agents described above. The alcohols may be primary alcohols, and preferably polyols which contain at least two hydroxyl groups. Such polyols are also readily oxidized to aldehydes and carboxylic acids. This oxidation of polyols and the simultaneous reduction of the oxidizing agent are generally accompanied by the release of significant amounts of heat energy. One preferred fuel is glycerin.

In a typical implementation, the layer of non-granular solid reactant 464 is in contact with and/or presses down on an upper surface of the lower support structure 462 which helps maintain the typically substantially uniform distribution of granular solid reactant atop the lower support structure 462, at least until the layer of non-granular solid reactant 464 starts to dissolve.

There are a variety of ways in which the layer of non-granular solid reactant 464 may be formed. In one such exemplary method, the solid reactant (e.g., potassium permanganate coated with sodium silicate) may be supplied as a powder or in granular form into a cylindrical container and then exposed to humidity (e.g., in a humid environment or by using a humidifier, i.e., a collection of components that create humidity). In an exemplary implementation, the humidity causes the sodium silicate to absorb moisture from the humid environment and bind the powdered or granular solid reactant into a puck or disk-shaped configuration. Then, typically, the disk-shaped solid reactant is removed from the humidity and allowed to dry. In some implementations, drying may be accelerated by exposing the disk-shaped solid reactant to a heated environment (e.g., in an oven) for some period of time. The heated environment can be a relatively low temperature (e.g., 120° F.) and the period of time may be, for example, between 1 and 4 hours. However, it may be possible of course to use a higher temperature and a lesser amount of time to dry the humidified disk.

The upper structure 466 in the outer container 460 is disk-shaped and made of open cell foam, or another cellular or porous material, through which liquid (e.g., the liquid reactant) can flow or pass. In some implementations, the upper structure 466 is made from the same material as the lower support structure 462. However, that need not be the case. For example, in some implementations, the open cells or pores in the upper structure 466 may be larger than the open cells or pores in the lower support structure 462. In some implementations, the open cells or pores in the upper structure 466 may be smaller than the open cells or pores in the lower support structure 462.

The upper layer 468 in the illustrated implementation extends across and covers the open top of the outer container 460. More specifically, an outer perimeter of the bottom surface of the upper layer 468 is secured to the upper surface of the outwardly-extended flange portion of the outer container 460. In some implementations, the upper layer may be secured using a hot melt adhesive, or any other type of adhesive or securing technique that can maintain the upper layer 468 in contact with and sealed against the outer container 460 throughout the usable life of the self-heating assembly 100. When the upper layer 468 is so adhered against the outwardly-extended flange portion of the outer container 460, the upper layer 468 and the outer container 460 collectively seal the inner compartment of self-heating assembly 100 thereby preventing the escape of any loose powder, or the like, from the self-heating assembly 100.

In a typical implementation, the upper layer 468 is paper. However, in various implementations, the upper layer 468 can be another material. The other material should be permeable to liquid, and able to withstand operating conditions associated with self-heating assembly 100.

The sealed packages 101 can be assembled in a variety of ways.

One implementation of the assembly process includes providing the components thereof including the outer container or material (such as aluminum) to shape into the outer container, one or more pieces of open cell foam or another cellular or porous material to form or serve as the lower support structure and the upper structure, solid reactant (typically provided in granular form), paper (or some other liquid permeable and application-suitable material) to form the upper layer, and an adhesive material.

If a sheet of aluminum or other material is provided not in the shape of a tray, then that sheet of aluminum or other material is shaped to form a tray—typically one that has an upper, outwardly-extended flange, as shown in FIG. 1.

Next, if needed, the open cell foam or other cellular or porous material is cut to fit snugly into the bottom of the outer container to serve as the lower support structure. The lower support structure is then positioned in the bottom of the outer container.

Next, the granular reactant is poured into the outer container atop the lower support structure, typically filling in, at least some portion of the open cells of lower support structure.

Next, the non-granular disk of solid reactant is formed. This non-granular disk of solid reactant may be formed in a variety of different ways. For example, the non-granular disk of solid reactant may be formed outside of the outer container and dropped into the outer container atop the granular material that has been poured on top of and into the lower support structure. Alternatively, the non-granular disk of solid reactant may be formed inside the outer container on top of the granular material that has been poured on top of and into the lower support structure.

There are a variety of ways that the non-granular disk of solid reactant may be formed outside of the outer container. For example, the solid reactant (e.g., potassium permanganate coated with sodium silicate) may be supplied as a powder or in granular form into a cylindrical container and placed on a stand above water inside the container. This exposes the granular material to humidity. The humidity causes the sodium silicate to absorb moisture from the humid environment and bind the powdered or granular solid reactant into the puck or disk-shaped configuration. Then, the disk-shaped solid reactant is removed from the humidity and allowed to dry. In some implementations, drying may be accelerated by exposing the disk-shaped solid reactant to a heated environment (e.g., in an oven) for some period of time. If this method of forming the non-granular disk of solid reactant is utilized, then the disk, indeed multiple disks, can be prepared in advance of assembling the sealed package(s).

There are a variety of ways that the non-granular disk of solid reactant may be formed inside the outer container on top of the granular material that has been poured on top of and into the lower support structure. For example, additional granular material may be poured into outer container atop whatever granular material may have already been poured into the lower support structure. In a typical implementation, this additional granular material may be sufficient to form a layer that has a thickness that is the same, or at least substantially similar to, the thickness of the lower support structure. Next, the outer container, which contains the lower support structure and the granular material inside of it, is placed into a humid environment. This exposes the granular material to humidity. The humidity causes the sodium silicate to absorb moisture from the humid environment and bind the powdered or granular solid reactant into the puck or disk-shaped configuration. The binding also may cause the solid reactant to bind to the lower support structure and to the inner side walls of the outer container. Then, the outer container is removed from the humidity so that the granular material inside of it can dry. In some implementations, drying may be accelerated by exposing the outer container to a heated environment (e.g., in an oven) for some period of time.

The bonding helps ensure that the non-granular disk cannot shift around or move to one side of the reaction chamber, in a pile, for example, when the container is turned on its side in shipping or storage. In a typical implementation, the foam helps prevent the powder from shifting.

Next, if needed, the open cell foam or other cellular or porous material is cut to fit snugly into the outer container above the disk of solid reactant to serve as the upper structure. The upper structure is then positioned inside the outer container above the disk of non-granular solid reactant.

Next, if necessary, the paper (or other liquid permeable and application-suitable material) is cut to extend over the open top of the outer container. The material is then attached to the outer container, typically by the use of a hot melt adhesive to adhere the outer perimeter of the lower surface of the paper to the outwardly-extended flange of the outer container. In a typical implementation, the hot melt adhesive is applied to the entire perimeter of the paper/flange interface without breaks. The material thereby serves as the upper layer of the outer container and seals the aforementioned solid reactant and foam inside the sealed package.

Having preassembled sealed packages 101 (i.e., sealed packages 101 that have been assembled, as mentioned above for example, prior to manufacturing the self-heating assembly 100) facilitates manufacturability of the self-heating assembly 100. In this regard, the sealed package 101 (or multiple sealed packages 101) can be manufactured, and, when a self-heating assembly 100 is being manufactured, one of the sealed packages 101 can be simply dropped into the base of the self-heating assembly 100 at an appropriate point in the manufacturing process. This simplifies handling of the solid reactant, particularly the granular solid reactant, during the self-heating assembly 100 manufacturing process. For example, without the preassembled sealed packages 101, there is a significant risk that the granular reactant may be spilled or dust up, create a mess, and/or end up in parts of the self-heating container where it is not desired. However, with the preassembled sealed packages, containing and controlling the granular reactant is simplified and improved considerably.

To activate the heating functionality in the self-heating assembly, a user would manipulate the handle 117 to cause the shaft 115 to rotate about axis "A" in the direction indicated by arrow "B." This would cause the cutting blades 157 to move into, and eventually cut or rupture the frangible container 110. In the illustrated example, to manipulate the handle in this way, the user might first lower the handle 117 to an activating position (e.g., by swinging the handle about hinge 121) and then rotating the handle about the axis "A" in the direction indicated by arrow "B."

When the liquid fuel is released from the frangible container 110, the liquid fuel flows in a downward direction toward the bottom of the self-heating assembly 100. Since the sealed package 101 is at the bottom of the self-heating container 100 and fills (or at least substantially fills) the bottom of the self-heating container 100, most, if not all, of the liquid fuel released from the ruptured frangible container 110 passes through the upper layer 468 of the sealed package 101 and into sealed package 101.

The liquid fuel that flows into the sealed package 101 flows through the open cellular structure of the upper structural element 466 inside the sealed package 101. Passing through the open cellular structure of the upper structural element 466 tends to distribute the liquid fuel across the upper surface of the disk of non-granular solid reactant 464. Wherever the liquid fuel contacts the disk of non-granular solid reactant 464, it reacts with the non-granular solid reactant exothermically.

Some of the liquid fuel that flows into the sealed package 101 also finds its way down to the bottom of the sealed package 101, where it comes into contact with the granular solid reactant that is distributed throughout the open cellular network of the lower support structure 462. Wherever the liquid fuel contacts the granular solid reactant, it reacts with the granular solid reactant exothermically.

In a typical implementation, heat from the exothermic reaction(s) causes liquid, especially at the bottom of the sealed package 101, to boil. The boiling creates turbulence which tends to urge the liquid fuel from the bottom of the sealed package 101 to move incrementally up through the open cellular structure of the lower support structure 462 to contact more and more of the granular solid reactant embedded in the lower support structure 462. Eventually, the level of liquid (and the boiling of that liquid) increases in the bottom of the sealed package 101 to the point where the liquid fuel is able to reach the bottom of the non-granular disk of solid reactant 464. This causes an exothermic reaction to occur at the surface bottom of the non-granular disk of solid reactant. At this point, in a typical implementation, heat is being produced by exothermic reactions occurring above and below the non-granular disk of solid reactant 464. This produces a large amount of heat very quickly to heat any product (e.g., food, drink, etc.) in the product tray 102.

A number of embodiments of the invention have been described. Nevertheless, it will be understood that various modifications may be made without departing from the spirit and scope of the invention.

For example, the notion of using a frangible container that includes a shrink film material to contain a liquid reactant could be used in a self-heating container that relies on the reaction of two liquid reactants to produce the exothermic reaction. A frangible container (with the shrink film material), in such implementations, could be used to contain either one of the liquid reactants in that example. Moreover, in some such implementations, a second frangible container (that also includes shrink film material) could be used to contain the second liquid reactant.

In some implementations, the moisture barrier material could be outside the shrink film material in a particular frangible container configuration, though, in most instances, this would be less preferred.

In various implementations, a frangible container may include more than one moisture barrier material and/or more than one shrink film material. In some such instances, each moisture barrier material may be provided as a separate sheet or pouch, and/or each shrink film material may be provided as a separate sheet or pouch.

The self-heating assembly described herein is only one example of a self-heating container in which the sealed package can be used. The size, shape, and relative configuration of the various parts of the self-heating container can vary considerably. In various implementations, different types of material may be used to form those parts as well.

For example, in the implementation shown in FIGS. 1-3, the frangible container is directly beneath the base of the product tray, the cutting element is directly beneath the frangible container and the sealed package (containing the solid reactant) is directly beneath the cutting element. Other relative arrangements are possible. For example, in some implementations, the cutting element could be above or on a side of the frangible container. Also, the cutting element could take a form other than the shaft with cutting blades represented in FIGS. 1-3. For example, the cutting element could include one or more spikes that are moved in n axial manner to puncture the frangible membrane.

The size and relative configurations of the inner product tray and the outer heater tray can vary considerably. Thus, the size and shape of the chamber between the inner product tray and the outer heater tray can vary as well. The size and shape/configuration of the sealed package can vary considerably. Other aspects of the sealed package can vary as well.

The sealed package can have any one of a variety of different shapes. In some implementations, for example, the shape may be that of a bowl or plate. In other implementations, the sealed package may be an oval or any other shape.

In some implementations, all of the solid reactant can be in granular form, with none of the solid reactant in the disk-shaped non-granular configuration described herein. In some of those instances, the granular solid reactant may be sufficient in amount to fill approximately $\frac{1}{3}^{rd}$ of the sealed package.

The lower support structure and/or the upper structure can take any one of a variety of different forms. For example, in various implementations, any one or both may be an open cell foam, a non-woven material such as felt, a filter pad, a quilted tea bag material, deep flocking, a water-permeable honeycomb, deep-pile carpet, short lengths of tubing packed tightly together, a layered mass of tissue paper (e.g., with granules packed between layers), etc. In some implementations, including the one shown in FIGS. 1-3, both layers are open cell foam.

In a typical implementation, some of the granules are held in place by the lower support structure itself. For example, in the case of open cell foam, some of the granules may be positioned or wedged inside the open cells of the foam and held in place by virtue of being so wedged. Additionally, in a typical implementation, prior to heater activation, the lower support structure is in close physical contact with its surrounding components (e.g., the side walls of the heater tray, the bottom surface of the heater tray, etc.). This sort of arrangement can help prevent any loose granules (e.g., ones that are not tightly held in place by the support structure itself) from migrating around within the self-heating assembly (e.g., above, below or on the sides of the support structure).

The means for activating the reaction by rupturing the frangible container is described as an external knob connected to an internal shaft with cutting blades that extend in a radially outward direction from the shaft generally parallel to one another. The activation means, however, can take any one of a variety of different forms. For example, in various implementations, the activation means may be a sliding element with a cutting blade that moves into the frangible container when slid, or a push button that can be pressed to urge a spike or other cutting blade into the frangible container, or a pair of surfaces that can be pushed toward one another to squeeze the frangible container until it ruptures, or something else. Even the activation means shown in FIGS. 2 and 3, for example, can vary—with more or less cutting blades, with the cutting blades being longer or shorter or having a different shape, with a different kind of external knob, etc.

In an exemplary implementation, the first liquid reactant is or contains a fuel (e.g., a polyol fuel, such as ethylene glycol or glycerol) and the second granular reactant is or contains an oxidizing agent (e.g., alkali metal permanganate, for example, potassium permanganate). In some exemplary implementations, the first liquid reactant is or contains water and the second granular reactant is or contains calcium oxide. Any set of reactants may be used, as long as one is a liquid or slurry that can flow through the upper layer of the sealed package and through the upper structure and lower support structure to access the other reactant, a granular and/or solid disk reactant in the sealed package. In one specific implementation, the reactants are potassium permanganate and a water solution of glycerin.

In a typical implementation, the grains of solid reactant will have been over coated with graded thicknesses of sodium silicate (water glass). Since sodium silicate is slowly soluble in hot water, and water may be a major component of the liquid, varying the thicknesses of sodium silicate allow adjustments in the time at which the potassium permanganate granules react with the polyol fuel. In some implementations, however, no sodium silicate is included.

The relative and absolute sizes of the various sub-components can vary considerably. A variety of materials may be suitable to form each sub-component.

The support structure(s) can be virtually any kind of structures that are able to perform the functionalities described herein and attributed to the support structure(s).

In various implementations, various types of tamper-evidence protection can be provided. Generally speaking, tamper-evidence protection provides an indicator or barrier to entry which, if breached or missing, can reasonably be expected to provide visible evidence to consumers that tampering has occurred. Examples of tamper-evidence protection can include, for example, break-away tabs, plastic wrap around external portions of the knob assembly, etc.

Various methods may be used to manufacture the layer of no-granular solid reactant. In one exemplary method, after placing an open top outer container (with the lower support structure and the granular reactant inside) in a water-vapor saturated atmosphere for about 12 hours the granules are formed into a rigid cake. They are then oven dried. A second disk of open-cell foam is then placed on top of the granular clump to provide a fuel flow path on the top, and a lightweight unglazed paper disk is cemented over the top to complete the package. The deliberate use of a fuel flow path on top of the granule cake helps prevent both the paper and the plastic fuel bag from sealing all or a portion of the granule bed during the initial fuel injection.

It should be understood that any relative terminology used herein, such as "upper", "lower", "above", "below", "front", "rear", etc. is solely intended to clearly describe the particular implementations being discussed and is not intended to limit the scope of what is described here to require particular positions and/or orientations. Accordingly, such relative terminology should not be construed to limit the scope of the present application. Additionally, the term substantially, and similar words, such as substantial, are used herein. Unless otherwise indicated, substantially, and similar words, should be construed broadly to mean completely and almost completely (e.g., for a measurable quantity this might mean, for example, 99% or more, 95% or more, 90% or more, or 85% or more).

In some implementations, the granular reactant is distributed or dispersed, with substantial uniformity, throughout the lower support structure. This means that the density of grains in multiple equal volumes of support structure (e.g., cubic centimeters) does not vary more than some particular amount (e.g., 10%, 15%, 20%, etc.). Moreover, in a typical implementation, the lower support structure supports and substantially maintains the distribution of the granular reactant throughout the lower support structure before and during the exothermic chemical reaction. In some implementations, this may mean preventing shifting of grains (of the granular reactant) so as to maintain the substantial uniformity of distribution.

The self-heating assembly can be used to heat any one of a variety of different products including food products, drinks, or non-edible goods.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations and/or processes are disclosed herein as occurring in a particular order, this should not be understood as requiring that such operations be performed in the particular order shown or in sequential order, or that all indicated operations be performed in order to achieve desirable results.

Other implementations are within the scope of the claims.

What is claimed is:

1. A self-heating assembly comprising:
   a product tray for containing a product to be heated;
   a heater tray outside the product tray and configured relative to the product tray to define a reaction space between the heater tray and the product tray;

a frangible container inside the reaction space, wherein the frangible container contains a first reactant that is a liquid, a second reactant outside the frangible container, wherein the second reactant reacts exothermically upon contact with the first reactant, and wherein the frangible container is made from a material that comprises a shrink film material.

2. The self-heating assembly of claim 1, wherein the material of the frangible container further comprises a moisture barrier material.

3. The self-heating assembly of claim 2, wherein the moisture barrier material forms a moisture barrier pouch that contains and surrounds the liquid reactant, and wherein the shrink film material forms a shrink film pouch that contains and surrounds the moisture barrier pouch.

4. The self-heating assembly of claim 2, wherein a space between the shrink film material and the moisture barrier material is evacuated so that the shrink film material is in direct physical contact with an entire external surface of the moisture barrier material, with no empty space between the shrink film material and the moisture barrier material.

5. The self-heating assembly of claim 1, further comprising a means for activating an exothermic reaction by rupturing the frangible container.

6. The self-heating assembly of claim 5, wherein rupturing the frangible container releases the liquid first reactant from the ruptured frangible container, enabling the liquid first reactant to flow down into the second reactant thereby initiating the exothermic reaction.

7. The self-heating assembly of claim 6, wherein heat from the exothermic reaction flows up through the reaction space to and through the product tray to heat the product.

8. The self-heating assembly of claim 7, wherein the heat from the exothermic reaction reaches the frangible container and causes the frangible container to begin shrinking.

9. The self-heating assembly of claim 8, wherein the shrinking squeezes at least some portion of the liquid first reactant remaining in the frangible container out of the frangible container.

10. The self-heating assembly of claim 1, wherein the shrink film material is a material selected from a group consisting of polyethylene (PE), polyvinyl chloride (PVC), polyolefin (POF), polyethylene terephthalate (PET), polylactic acid (PLA), and combinations thereof.

11. The self-heating assembly of claim 1, further comprising:
a sealed package inside the heater tray, wherein the sealed package comprises:
an outer container;
a lower support structure within the outer container;
a layer of solid reactant above the lower support structure and within the outer container;
an upper structure above the solid reactant and within the outer container; and
the upper layer that is permeable to liquid and that extends across an otherwise open top of the outer container above the upper structure.

12. The self-heating assembly of claim 11, wherein each of the lower support structure and the upper structure comprises a material selected from the group consisting of open cell foam, a non-woven material, a filter pad, a quilted tea bag material, deep flocking, a water-permeable honeycomb, deep-pile carpet, short lengths of tubing packed tightly together, and a layered mass of tissue paper.

13. A method of heating a product, the method comprising:
providing a self-heating assembly that comprises:
a product tray for containing a product to be heated;
a heater tray outside the product tray and configured relative to the product tray to define a reaction space between the heater tray and the product tray;
a frangible container inside the reaction space, wherein the frangible container contains a first reactant that is a liquid, and wherein the frangible container is made from a material that comprises a shrink film material;
a second reactant outside the frangible container, wherein the second reactant reacts exothermically upon contact with the first reactant; and
a means for activating an exothermic reaction by rupturing the frangible container; and
manipulating the means for activating an exothermic reaction to rupture the frangible container.

14. The method of claim 13, wherein the material of the frangible container further comprises a moisture barrier material.

15. The method of claim 14, wherein the moisture barrier material forms a moisture barrier pouch that contains and surrounds the liquid reactant, and wherein the shrink film material forms a shrink film pouch that contains and surrounds the moisture barrier pouch.

16. The method of claim 14, wherein a space between the shrink film material and the moisture barrier material is evacuated so that the shrink film material is in direct physical contact with an entire external surface of the moisture barrier material, with no empty space between the shrink film material and the moisture barrier material.

17. The method of claim 13, wherein rupturing the frangible container releases the liquid first reactant from the ruptured frangible container, enabling the liquid first reactant to flow down into the second reactant thereby initiating the exothermic reaction.

18. The method of claim 17, wherein heat from the exothermic reaction flows up through the reaction space to and through the product tray to heat the product.

19. The method of claim 18, wherein the heat from the exothermic reaction reaches the frangible container and causes the frangible container to begin shrinking.

20. The method of claim 19, wherein the shrinking squeezes at least some portion of the liquid first reactant remaining in the frangible container out of the frangible container.

21. The method of claim 11, wherein the shrink film material is a material selected from a group consisting of polyethylene (PE), polyvinyl chloride (PVC), polyolefin (POF), polyethylene terephthalate (PET), polylactic acid (PLA), and combinations thereof.

* * * * *